March 8, 1938.  F. W. PEEL  2,110,400
PROCESS FOR MANUFACTURING RUBBER
Filed May 8, 1935   2 Sheets—Sheet 1
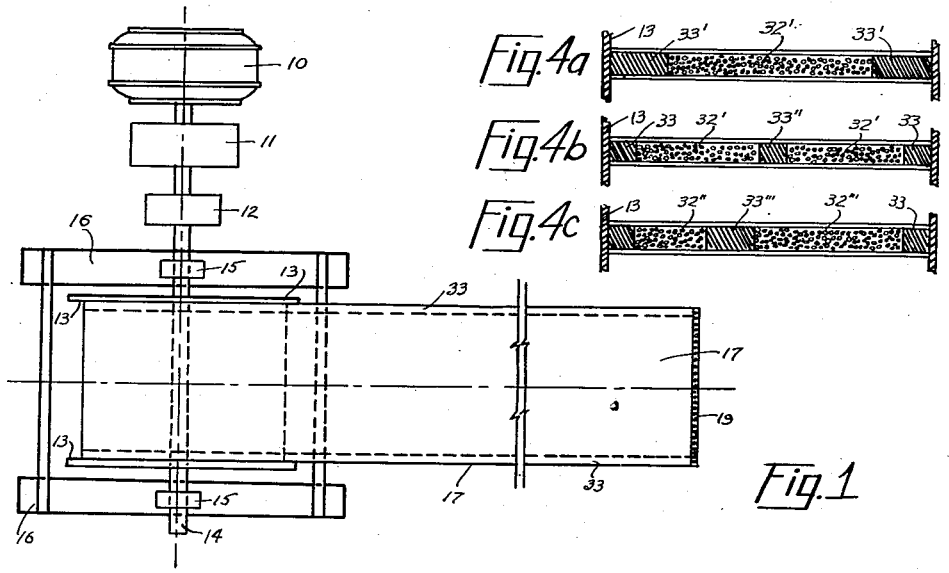
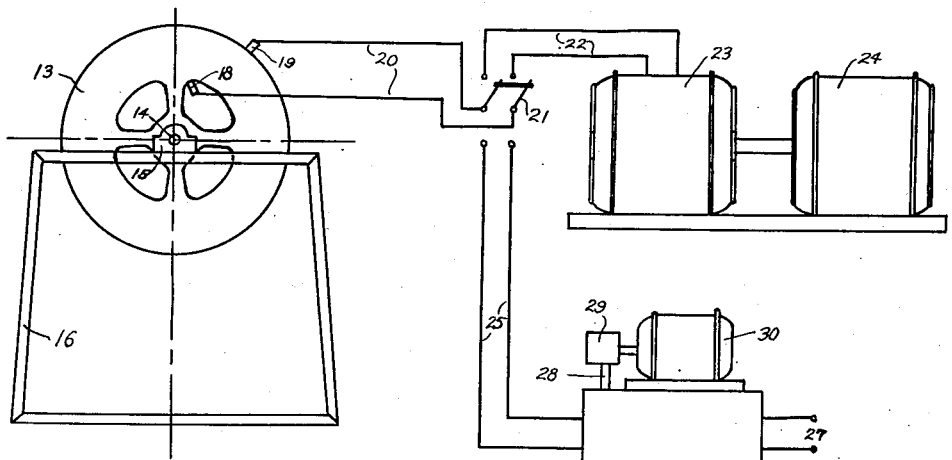
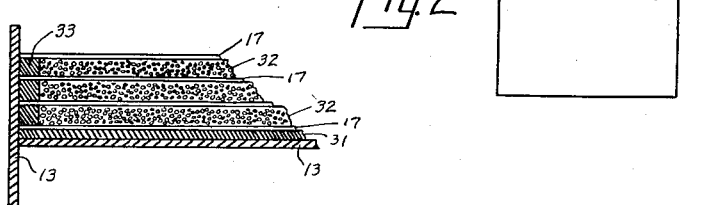
INVENTOR.
Frederick W. Peel
BY
ATTORNEY.

March 8, 1938.   F. W. PEEL   2,110,400
PROCESS FOR MANUFACTURING RUBBER
Filed May 8, 1935   2 Sheets-Sheet 2
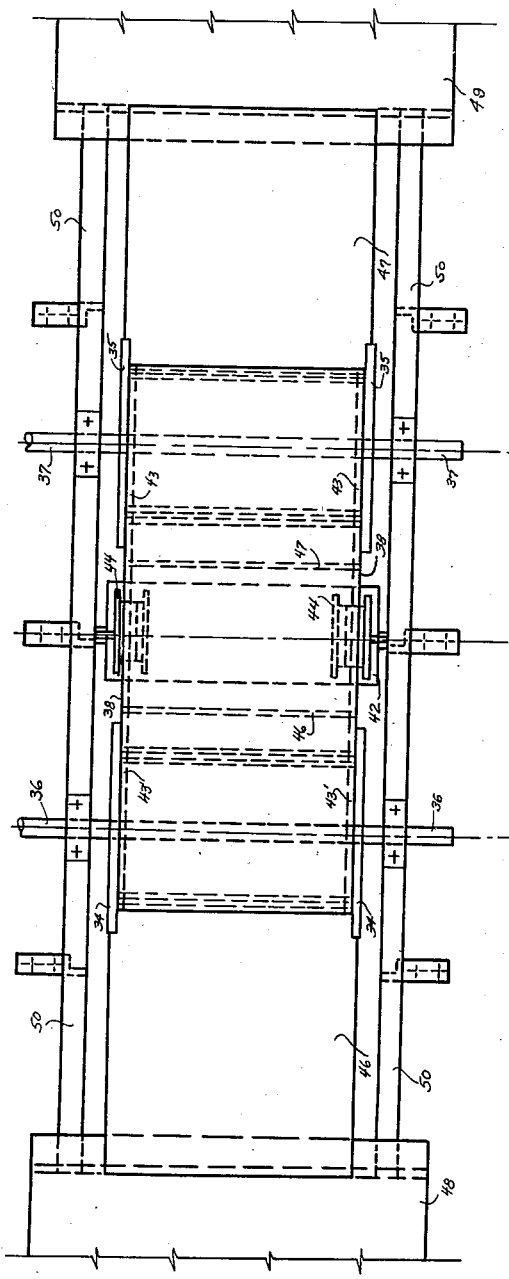
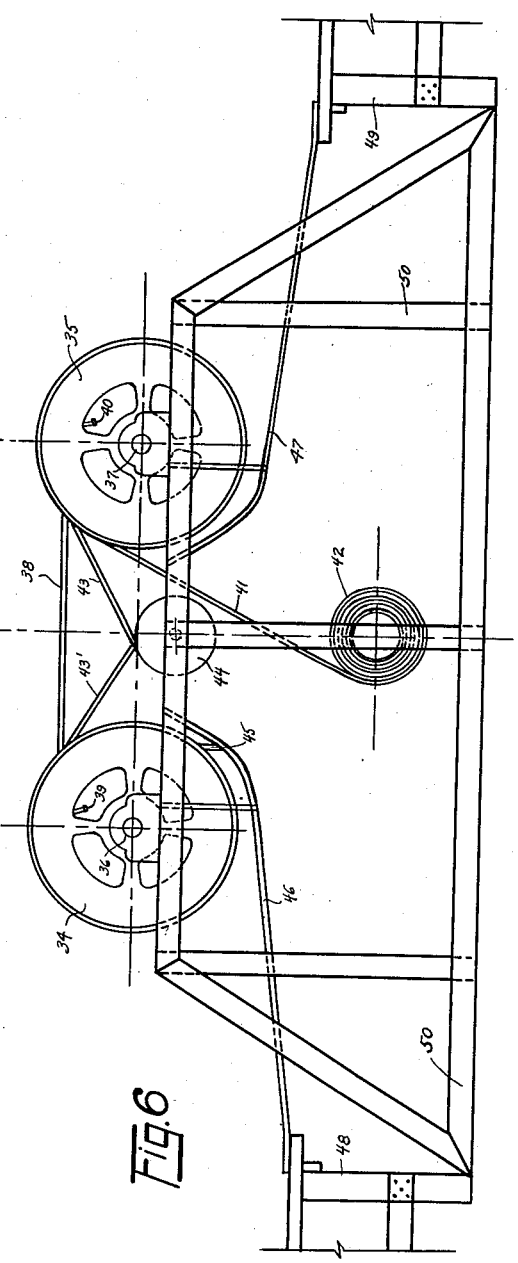
INVENTOR.
FREDERICK W. PEEL
BY
ATTORNEY.

Patented Mar. 8, 1938

2,110,400

UNITED STATES PATENT OFFICE 2,110,400

PROCESS FOR MANUFACTURING RUBBER

Frederick William Peel, Baltimore, Md., assignor to Rubatex Products, Inc., New York, N. Y., a corporation of Delaware Application May 8, 1935, Serial No. 20,364

9 Claims. (Cl. 18—53)

My invention relates to a novel method of and means for making expanded rubber material.

Heretofore, in the manufacture of expanded cellular rubber in which the individual minute cells are sealed from each other in the final product, the process of manufacture, as described in the United States Denton Patent 1,905,269, involved at least two distinct stages.

In one stage, the prepared rubber mix is admitted into a gassing chamber designed to carry an exceedingly high pressure. The rubber is then subjected to a gas at a pressure of several thousand pounds to thoroughly impregnate the rubber with the gas.

Simultaneously the rubber is heated to a temperature for partially vulcanizing the rubber in order that the rubber will retain the gas with which it is becoming saturated.

Such a process has been found to have distinct limitations in the amount of rubber which may be treated at one time due to the difficulty in obtaining a uniform application of heat throughout the mixture. To insure such uniform temperature, it is necessary to keep the quantity of the mix in the pressure chamber to a fraction of the amount which would fill the chamber, i. e., for a chamber one and a half feet in diameter and ten feet long, it has been found by experiment that the charge is limited to only twenty-five percent of the load capacity of the chamber in order to obtain the proper conditions in the rubber compound.

The gassing chamber, which because of the high gas pressure used is necessarily an expensive device consisting of heavy metal castings, is accordingly used in an inefficient manner. Moreover, if large sized materials are desired, such large gassing chambers are necessary as to render the cost practically prohibitive.

I have discovered that it is possible to first partially cure the dough separately from the gassing chamber and thereafter subject it to the gassing process. Thus I am enabled to apply the proper temperature to the mix in a relatively cheap receptacle where size is unimportant and build the more expensive pressure gas chamber to operate at full capacity. Uniform gassing of the partly cured rubber compound is then accomplished with no application of heat.

The final curing process is generally carried out in a mold conforming to the final shape and placed in an electric oven; or in a hydraulic press with steam platens; or in an otherwise conforming configuration with the application of the proper temperature and pressure.

A hydraulic press with steam platens to manufacture a sheet of expanded rubber three feet wide by one hundred feet long, including the necessary accumulator, hydraulic pump, etc. would cost approximately $50,000 and weigh 125 tons. A similar sized material produced in molds to be placed in an electric oven is similarly very expensive. These molds need to be designed to overcome the terrific pressures encountered in this process.

I have discovered that this final curing process may be carried out much more efficiently effectively and economically for products of any desired length by mounting the rubber strips so that each strip in effect acts as a press for the next adjacent strip as described hereinafter.

Accordingly, an object of my invention is to provide a novel process of making expanded gassed rubber.

A further object of my invention is to provide a novel process of making expanded rubber in which the dough is partly cured before gassing.

A still further object of my invention is to provide a novel process of making expanded rubber in which the gas pressure may be applied without simultaneous heating.

Another object of my invention is to provide a novel process of making expanded rubber in which relatively large quantities of rubber may be uniformly heat treated and gassed in a given gassing chamber.

Still a further object of my invention is to provide novel means for efficiently effecting a final cure of relatively long lengths of expanded rubber product.

Another object of my invention is to provide novel means for efficiently effecting a final cure of several relatively long strips of expanded rubber product, simultaneously, and in a single apparatus.

Still a further object of my invention is to provide a novel continuous process in the manufacture of the expanded rubber.

Further objects and advantages of my invention which, together with the foregoing, will appear in the detailed description which is to follow in connection with the drawings, in which:

Figure 1 is a plan view of one form of my invention before the spooling of the rubber and the element on the mandrel.

Figure 2 is an elevation of the mandrel with a schematic electric circuit for the apparatus.

Figure 3 is a sectional view of the mandrel with the rubber and element coiled in position.

Figures 4a, b, and c are sectional views of different arrangements of the spacer strips in the coiled elements.

Figure 5 is a plan view of another embodiment of my invention.

Figure 6 is an elevation of the unit shown in Figure 5.

In carrying out my invention, the following ingredients are individually mixed on the mill in a manner well known in the art of rubber compounding:

| | Percent |
|---|---|
| Pale crepe | 76.0 |
| Light calcined magnesia | 6.1 |
| Lithopone | 6.1 |
| Paraffin wax | 3.0 |
| Zinc oxide | 3.0 |
| Sulphur | 4.6 |
| D. P. G. | .5 |
| Agerite P | .5 |
| Carbon black | .2 |

These are percentages by weight of a mixture which I have preferred for the purpose of illustration. Reasonable changes in the components or their proportions are entirely feasible. Moreover, as will be clear from the description to follow, any other desired mix may be used in my process.

After preparing the dough in the manner described in application Serial No. 717,550, it is removed from the mill and placed on a calender to form it to uniform thickness and size. It is then subjected to a heating process equivalent to steam of twenty pounds pressure for five minutes. This heating may be obtained either electrically or steam heated or by any other well known means, and varied according to alteration of the specified mixture. At the completion of this stage the mix is partly cured.

The rubber compound is then placed in a gassing chamber and is subjected to a gas pressure of 2500 pounds or more, for four hours. No heat is applied during this gassing stage. The previous partial curing of the dough makes this departure practicable. The gas pressure is released as rapidly as possible, and the rubber compound is then removed from the chamber. The mix will now be thoroughly and uniformly gassed. Inasmuch as no heat is applied during gassing and therefore no problem of uniform heating is raised, the gassing chamber may be loaded with the rubber mix to its full capacity without in any way affecting the resulting homogeneity.

The final curing process for expanded rubber is well established in the art. Essentially, it is the application of the proper temperature to the rubber while positioned in a conforming enclosure which limits the expansion to the final preferred form. For long lengths, or large sizes, conforming enclosures to sustain the necessary pressures in this process are generally bulky and costly units, as pointed out hereinbefore.

In Figures 1, 2, and 3, I have illustrated a simple form of my invention for carrying out this final process more efficiently and economically in which the rubber is finally cured in rolled layers, each layer acting as an effective press for the adjacent layers.

The mandrel 13 is mounted on a shaft 14 which is supported by two bearings 15 on the frame 16. The shaft 14 is connected to a drive source, consisting of a motor 10 driving the reduction gear box 11 which is coupled to shaft 14 by the coupling and drive control unit 12.

In Figure 1, the element 17 is shown extended in its unspooled position. The element 17 is a steel sheet mechanically affixed at one end 18 to the mandrel. The end 18 acts as one terminal and the other end 19 as the other terminal to be connected to a source of electric current.

Conductor 20 connects these terminals to the switch 21. This conductor should, of course, be of low resistance relative to that of the element 17 and should have a large current carrying capacity.

When the element 17 is connected to a current source, it will uniformly conduct this current across its section. A sufficiently large current will heat the element uniformly throughout the area of the steel sheet.

I indicate two alternative sources of current in Figure 2. A direct current generator 23 is connected to the switch 21 by cable 22. Motor 24 drives this motor-generator set. The generator 23 will be of high current and low voltage rating. Its actual rating will depend upon the temperature necessary for the final curing process, and upon the resistance of the element 18. The resistance of element 18 depends on the material it is made of and its size.

An alternating current source is shown in the form of 26 which is a step down transformer with its primary winding connected to the power mains at 27, and its secondary winding connected to the switch 21 by cables 25. It is practicable to have an adjustable value of low output voltage on the secondary by having a movable primary winding or an induction regulator in the primary circuit to avoid a multiplicity of heavy switches for it. I have indicated the movable primary type transformer in Figure 2, this movable primary being connected to the drive 28, through the gear box 29 to the driving motor 30.

Figure 3 shows a sectional view of the rubber and element assembled on the mandrel. An asbestos covering 31 is placed on the mandrel 13 and the sheet steel element 17 is then wound around the covering. This covering may be of other material with good electrical and thermal insulating properties. I have found a one-half inch layer of asbestos to be very satisfactory. The partially cured and gassed rubber 32 is coiled together with the element 17 as shown in Figure 3. The asbestos covering 31 acts to insulate the first layer of the element electrically and thermally from the mandrel 13. The steel sheet element 17 serves to keep each layer of rubber 32 from touching each other. The steel sheet is separated a predetermined distance by the asbestos spacer strips 33 (Figures 1 and 3). The thickness of these spacer strips 33 determines the thickness of the finished rubber product.

The element 17 is coiled over the top of the rubber at the top end of the coil, as shown in Figure 3. The top end of the element 17 is mechanically fixed after coiling, in order to prevent any slipping or other movement during curing. The terminals 18 and 19 are now connected to a suitable current source through switch 21. The element 17 heats up uniformly and conducts the heat evenly to all the surfaces of the coiled up gassed rubber.

The width of these spacer strips may be changed to accommodate different possible widths of rubber that may be cured in a given mandrel. Accordingly, I illustrate in Figure 4a the spacer strips 33' which are wider than the ones shown in Figure 3 as 33. The resulting rubber 32' width is therefore less.

By causing a spacer strip 33'' to be placed in the middle of the section as shown in Figure 4b, it is possible to cure two strips of rubber 32' of half the normal width. The central spacer strip may be of arbitrary width, and positioned to accommodate two different widths of rubber 32'' and 32''', as sketched in Figure 4c, the spacer strip shown as 33'''. By similar schemes, more than two rubber strips may be cured, by suitably arranging them across the mandrel with proper spacer strips placed continuously along their sides.

In this final curing process of the gassed rubber that I have hereinbefore described, a temperature of approximately 200° F. is applied through suitable electrical design. The rubber expands during this final heating, and soon exerts a pressure upon the adjacent sheet steel surface when it tends to become thicker than the asbestos spacer strips 33. However, the inside turns of the steel sheet or element 17 have equal pressures exerted on the two opposite sides. These pressures therefore balance each other and mutually assist in conforming the rubber to its final and correct uniform thickness. The pressure on the outermost coil of the sheet steel 17 is readily balanced by suitable mechanical anchorage.

By this simple method, the final curing of a hundred foot length of rubber is possible with a three hundred pound automatic coil heater, at a cost of $500 as compared to the 125 ton hydraulic system costing around $50,000.

In Figures 5 and 6 I illustrate a more commercial embodiment of my invention. Two mandrels 34 and 35 are mounted on the frame 50 by their respective shafts 36 and 37. These shafts are connected to independent drive sources similar to the shaft 14 of Figure 1. The common steel sheet element 38 has each of its ends anchored in one of the mandrels, and electrically insulated therefrom. Thus end 39 is on mandrel 34, and end 40 is on mandrel 35. These ends act as terminals to connect the element 38 to the source of current.

The gassed rubber 41 is mounted on the drum 42 and is coiled alternately upon the mandrels 34 and 35. The asbestos spacer strips 43, 43' are mounted on reels 44 and are used as required. Figure 6 indicates the procedure of coiling the gassed rubber 41 with the strips 43 and the steel element 38 upon mandrel 35 while simultaneously uncoiling the cured rubber 45, the spacer strips 43' and the common steel element 38 from the mandrel 34. Convenient chutes 46 and 47 are arranged to convey the cured rubber to the tables 48 and 49 in a novel continuous process.

Although I have described in detail the specific constituents of a preferred form of my product, and although I have fully described and disclosed the processes and novel means to accomplish these, it will be apparent that variations and modifications may be made within the scope of the invention, both in the constituent parts and in the details shown and described for purposes of illustration, and I do not intend to be limited except as set forth by the appended claims.

I claim:

1. The method of manufacturing expanded rubber which comprises heating the rubber mix to a temperature sufficient to partially vulcanize it; subjecting the partially vulcanized rubber to a gas at a relatively high pressure; and heating the rubber to complete the vulcanization of the rubber.

2. The method of manufacturing expanded rubber which comprises heating the rubber mix to a temperature sufficient to partially vulcanize it; subjecting the partially vulcanized rubber to a gas at a pressure of the order of 2,500 pounds; and heating the rubber to complete the vulcanization of the rubber.

3. The method of manufacturing expanded rubber which comprises heating the rubber mix to a temperature sufficient to partially vulcanize it; subjecting the partially vulcanized rubber to a gas at a pressure of the order of 2,500 pounds; releasing the gas pressure as rapidly as possible; and heating the rubber to complete the vulcanization of the rubber.

4. The method of manufacturing expanded rubber which comprises partially vulcanizing the rubber mix; subjecting the partially vulcanized rubber to a gas at a relatively high pressure in the absence of heat; releasing the gas pressure as rapidly as possible; and laying the rubber in sheets between a spiral band of metal which is electrically heated, the successive layers of the metal band being held in spaced relation to each other.

5. The method of manufacturing expanded rubber which comprises partially vulcanizing the rubber mix; subjecting the partially vulcanized rubber to a gas at a pressure of the order of 2,500 pounds in the absence of heat; releasing the gas pressure as rapidly as possible; laying the rubber in sheets between a spiral band of metal which is electrically heated; and intermittently feeding the vulcanized rubber after complete vulcanization through chutes.

6. The method of manufacturing expanded rubber which comprises admitting rubber which has first been partially vulcanized into an autoclave, impregnating the partially vulcanized rubber with an inert gas at a relatively high pressure until the rubber has been thoroughly impregnated with the gas, thereafter removing the rubber and finally vulcanizing and expanding the rubber.

7. The method of manufacturing expanded rubber which comprises admitting rubber which has first been partially vulcanized into an autoclave, impregnating the partially vulcanized rubber with an inert gas at a pressure in excess of 2500 pounds until the rubber has been thoroughly impregnated with the gas, thereafter removing the rubber and finally vulcanizing and expanding the rubber.

8. The method of manufacturing expanded rubber which comprises admitting partially vulcanized rubber into an autoclave until the autoclave is substantially filled with the rubber, subjecting the partially vulcanized rubber to a gas at a relatively high pressure, releasing the pressure as rapidly as possible and heating the gas impregnated rubber for final vulcanization and expansion thereof.

9. The method of making closed cell gas expanded rubber which comprises mixing rubber with suitable modifying agents; heating the rubber mix to a temperature sufficient to partially vulcanize it; gassing the rubber to gas impregnate the same; expanding the gassed and partially vulcanized rubber to form a closed cell gas expanded rubber and heating the closed cell gas expanded rubber to complete the vulcanization thereof.

FREDERICK W. PEEL.